Figure 1:
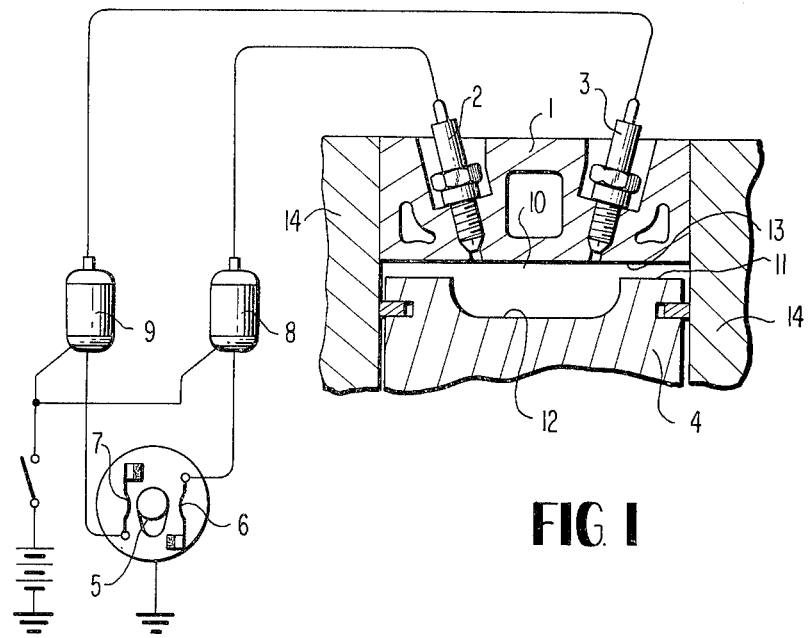

United States Patent [19]
Scherenberg

[11] 3,926,152
[45] Dec. 16, 1975

[54] ROTARY PISTON INTERNAL COMBUSTION ENGINE

[75] Inventor: Hans O. Scherenberg, Stuttgart, Germany

[73] Assignee: Daimler-Benz Aktiengesellschaft, Germany

[22] Filed: Nov. 6, 1974

[21] Appl. No.: 521,463

[30] Foreign Application Priority Data
Nov. 7, 1973   Germany............................ 2355587

[52] U.S. Cl........................... 123/8.09; 123/148 DS
[51] Int. Cl.²......................................... F02B 53/12
[58] Field of Search ....... 123/8.01, 8.09, 8.11, 8.13, 123/8.45, 148 DS; 418/61 A

[56] References Cited
UNITED STATES PATENTS
3,554,092   1/1971   Shibagaki et al. ............ 123/148 DS Primary Examiner—C. J. Husar
Assistant Examiner—Michael Koczo, Jr.
Attorney, Agent, or Firm—Craig & Antonelli

[57] ABSTRACT

A rotary piston internal combustion engine of trochoidal construction with an ignition system equipped with at least two spark plugs arranged in the housing casing; the ignition system is thereby so constructed that an alternate ignition of the spark plugs takes place with only a single ignition in a respective compression volume.

10 Claims, 2 Drawing Figures

ROTARY PISTON INTERNAL COMBUSTION ENGINE

The present invention relates to a rotary piston internal combustion engine, especially of trochoidal type of construction, with an ignition system including at least two spark plugs in the housing casing.

It is known in connection with rotary piston internal combustion engines to arrange several simultaneously igniting spark plugs one behind the other in the axial direction of the internal combustion engine or one behind the other in the circumferential direction in order to attain a good through-ignition of the fuel-air mixture in adaptation to an unfavorable combustion space shape. It is additionally no longer novel to so construct the ignition system in connection with an arrangement of two spark plugs offset in the circumferential direction that an ignition takes place at the second spark plug which is delayed in time after the ignition at the first spark plug. All of these prior art proposals have in common that each spark plug ignites in each compression volume. Since, however, with most of the rotary piston internal combustion engines, especially with those of trochoidal construction, the compression space accommodating the compression volume is not cooled off by fresh gases, very high thermal loads of the spark plugs will result which, on the one hand, will become noticeable by a reduced length of life and, on the other, in mechanical damages.

The present invention is therefore concerned with the task to so construct the ignition installation for rotary piston internal combustion engines that neither damages at the spark plugs nor damages caused by the same at the internal combustion engine will occur. The underlying problems are solved according to the present invention by such a construction of the ignition system that an alternate ignition of the spark plugs with only a single ignition per compression volume takes place.

As a result of the present invention, according to which, for example, with two spark plugs, each spark plug ignites only in each second compression volume, the thermal loads of the spark plugs are considerably reduced. Glow ignitions, i.e., ignition by incandescence, are prevented. Mechanical damages at the internal combustion engine resulting from ignitions by incandescence no longer occur. The temperature at the contact surface for the piston is reduced within the area of the spark plugs. As a result thereof, no harmful deformation or warping of the contact surface takes place. The ignition system remains over-all service-free for longer periods of time.

In an internal combustion engine with a polygonal piston and with spark plugs arranged offset in the circumferential direction at the housing casing, the ignition system may be constructed in one embodiment of the present invention in such a manner that the ignition of each individual spark plug takes place when the piston assumes the same position in relation to the respectively igniting spark plug.

With an arrangement of a three-cornered piston in a two-arched housing casing, advantageously three spark plugs may be provided in this case.

Accordingly, it is an object of the present invention to provide a rotary piston internal combustion engine of trochoidal construction which avoids by simple means the aforementioned shortcomings and drawbacks encountered in the prior art.

Another object of the present invention resides in a rotary piston internal combustion engine which considerably reduces the thermal loads of the spark plugs.

A further object of the present invention resides in a rotary piston internal combustion engine which not only increases the length of life of the spark plugs but also avoids mechanical damages in the engine, particularly in the housing casing.

Still a further object of the present invention resides in a rotary piston internal combustion engine of the type described above in which damages of the spark plugs or damages caused at the internal combustion engine by the spark plugs no longer occur.

Another object of the present invention resides in a rotary piston internal combustion engine with such an ignition system as precludes ignition by incandescence.

A further object of the present invention resides in a rotary piston internal combustion engine in which the temperature at the contact surface for the piston is reduced within the area of the spark plugs, whence no harmful deformation thereof occurs any longer.

Figure 2:
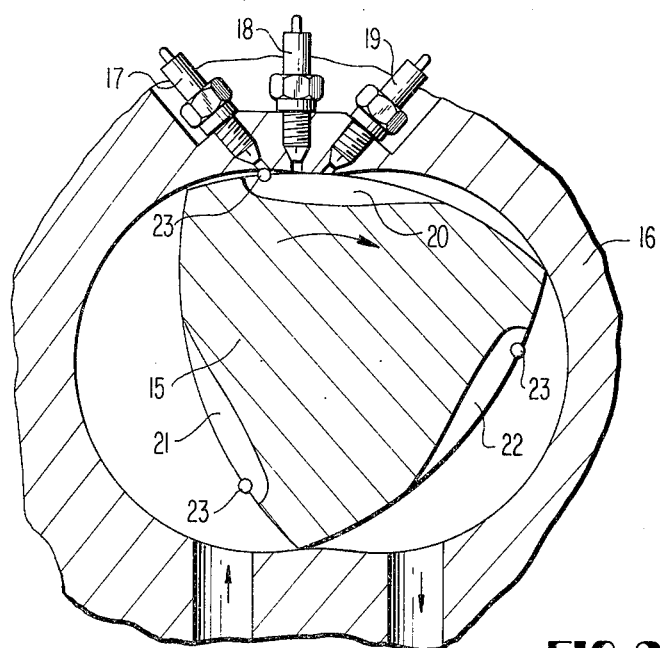

These and other objects, features, and advantages of the present invention will become more apparent from the following description when taken in connection with the accompanying drawing which shows, for purposes of illustration only, two embodiments in accordance with the present invention, and wherein:

FIG. 1 is a somewhat schematic, longitudinal cross-sectional view through the arrangement of two spark plugs in a housing casing of a rotary piston internal combustion engine of trochoidal construction in conjunction with an ignition system in accordance with the present invention; and FIG. 2 is a transverse cross-sectional view through a rotary piston internal combustion engine of trochoidal construction with three spark plugs arranged along the circumference of the housing casing.

Referring now to the drawing wherein like reference numerals are used throughout the two views to designate like parts, and more particularly to FIG. 1, according to this figure, two spark plugs 2 and 3 are arranged at the housing casing 1 in a rotary piston internal combustion engine of trochoidal construction having a three-cornered piston rotating within a two-arched housing; the spark plugs 2 and 3 are thereby arranged displaced in the axial direction of the internal combustion engine. The ignition system coordinated to the two spark plugs 2 and 3 essentially consists of an interrupter cam 5 rotating with half the rotational speed of the eccentric shaft of the internal combustion engine carrying the piston 4 and of two interrupters 6 and 7 with ignition coils 8 and 9.

If the interrupter cam 5 actuates the interrupter 6, then the spark plug 2 ignites into the compression volume 10 which is enclosed by the flank 11 of the piston 4, the combustion space recess 12, the running or contact surface 13 for the piston 4 and by the lateral parts 14 of the internal combustion engine housing. No ignition current reaches the spark plug 3 at this time. If the piston 4 then has continued to move so far that the next piston flank with the combustion space recess arranged therein encloses the next compression volume, the interrupter cam 5 actuates the interrupter 7 and the spark plug 3 ignites this compression volume. No ignition current reaches the spark plug 2 at this instant.

Accordingly, an alternate ignition of the spark plugs with only one ignition in a given compression volume takes place according to the present invention. The load of each spark plug is thereby considerably reduced.

In the case of the embodiment according to FIG. 2, three spark plugs 17, 18 and 19 are arranged in the two-arched housing casing 3 surrounding a three-cornered piston 15. The ignition system of these three spark plugs is so constructed by conventional means that the spark plug 17 ignites only in the combustion space 20 of the piston 15, the spark plug 18 only in the combustion space 21 and the spark plug 19 only in the combustion space recess 22. The ignition installation may additionally be so constructed by conventional means that each spark plug ignites the compression volume coordinated thereto at an instant when the piston 15 and therewith the respective combustion space recess assumes the same position in relation to the respectively igniting spark plug, i.e., if in the embodiment according to FIG. 2, the point 23 is disposed correspondingly underneath the respectively igniting spark plug which point 23 is located at the same place in all three combustion space recesses 20, 21 and 22. This can be achieved by conventional means, for example, mechanically or electrically in delaying the ignition instant so that the ignition of the spark plugs 17, 18 and 19 takes place exactly at that instant when the point 23 of the respectively coordinated combustion spaced recess is disposed precisely underneath the correspondingly igniting spark plug.

A further decrease of the load of the individual spark plugs is achieved by the arrangement and construction according to FIG. 2.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A rotary piston internal combustion engine with a housing casing, which includes an ignition means having at least two spark plugs at the housing casing, characterized in that said ignition means includes means providing an alternate ignition of the spark plugs with only one ignition in a respective compression volume of the combustion engine.

2. A rotary piston internal combustion engine according to claim 1, characterized in that the engine is of trochoidal construction.

3. A rotary piston internal combustion engine according to claim 1, characterized in that the spark plugs are offset with respect to each other in the axial direction of the engine.

4. A rotary piston internal combustion engine according to claim 3, characterized by means in the ignition means for sequentially igniting each of the spark plugs, only one spark plug being ignited at any one time.

5. A rotary piston internal combustion engine according to claim 1, with a polygonal piston and with spark plugs arranged offset in the circumferential direction at the housing casing, characterized in that the ignition of each individual spark plug takes place by the ignition means when the piston assumes substantially the same position in relation to the respectively igniting spark plug.

6. An internal combustion engine according to claim 5, characterized in that with an arrangement of a three-cornered piston in a two-arched housing casing, three spark plugs are provided.

7. An internal combustion engine according to claim 1, characterized in that the number of spark plugs corresponds to the number of compression volumes realized by the piston in one rotation.

8. A rotary piston internal combustion engine according to claim 7, characterized in that the engine is of trochoidal construction.

9. A rotary piston internal combustion engine according to claim 1, characterized by means in the ignition means for sequentially igniting each of the spark plugs, only one spark plug being ignited at any one time.

10. An internal combustion engine according to claim 9, characterized in that the number of spark plugs corresponds to the number of compression volumes realized by the piston in one rotation.

* * * * *